United States Patent [19]

Epstein et al.

[11] Patent Number: 5,280,705
[45] Date of Patent: Jan. 25, 1994

[54] FUEL INJECTION SYSTEM FOR SCRAMJET ENGINES

[75] Inventors: Michael J. Epstein, West Chester; Paul H. Kutschenreuter, Jr., Loveland, both of Ohio

[73] Assignee: General Electric Company, Cincinnati, Ohio

[21] Appl. No.: 902,260

[22] Filed: Jun. 22, 1992

[51] Int. Cl.⁵ .............................................. F02K 5/02
[52] U.S. Cl. ..................................... 60/247; 60/270.1
[58] Field of Search ............... 60/270.1, 740, 39.38, 60/247

[56] References Cited

U.S. PATENT DOCUMENTS

| | | | |
|---|---|---|---|
| 2,935,848 | 5/1960 | Billman | 60/741 |
| 2,944,391 | 7/1960 | Paris et al. | 60/270.1 |
| 3,020,717 | 2/1962 | Pearce, Jr. | 60/270.1 |
| 3,075,353 | 1/1963 | Mullaney et al. | 60/270.1 |
| 3,076,308 | 2/1963 | Sweet | 60/270.1 |
| 3,430,446 | 3/1969 | McCloy | 60/270 |
| 3,514,957 | 6/1970 | Evans | 60/270 |
| 3,517,510 | 6/1970 | Melenric | 60/249 |
| 3,864,907 | 2/1975 | Curran | 60/270.1 |
| 3,916,621 | 11/1975 | Amenta | 60/244 |
| 4,336,781 | 6/1982 | Overfield | 123/467 |
| 4,374,511 | 2/1983 | Schechter | 123/448 |
| 4,782,660 | 11/1988 | Domyan et al. | 60/258 |
| 4,821,512 | 4/1989 | Guile et al. | 60/270.1 |
| 4,903,480 | 2/1990 | Lee et al. | 60/270.1 |
| 4,962,641 | 10/1990 | Ghougasian | 60/247 |
| 5,072,581 | 12/1991 | Harshman | 60/740 |
| 5,163,292 | 11/1992 | Holleyman | 60/370 |

FOREIGN PATENT DOCUMENTS 2231093  7/1990  United Kingdom .

*Primary Examiner*—Richard A. Bertsch
*Assistant Examiner*—Timothy S. Thorpe
*Attorney, Agent, or Firm*—Jerome C. Squillaro

[57] ABSTRACT

To promote fuel and air mixing combustor of a scramjet engine, fuel is injected as a succession of pulses into the airstream flowing through the combustor. By controlling the duty cycle and flow rate of the fuel pulses, increased fuel penetration and mixing efficiency are obtained with an overall fuel flow schedule comparable to steady state fuel injection. With sequential pulsed operation of plural, variously located fuel injectors in phased relation, the combustor remains in a transient state to enhance mixing and to spread out the combustor heat load.

15 Claims, 5 Drawing Sheets

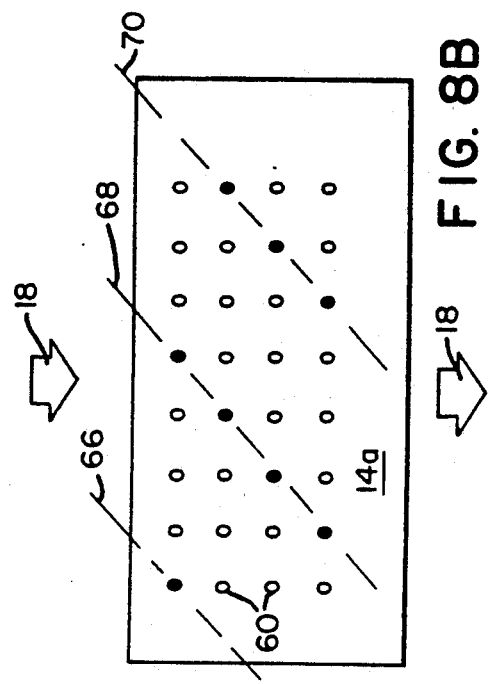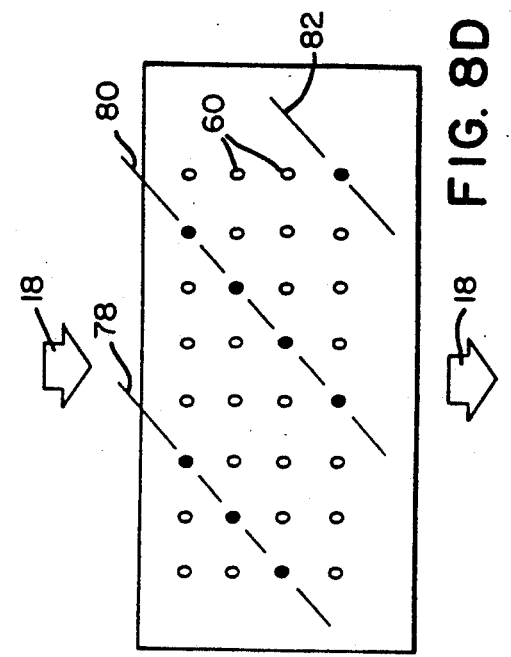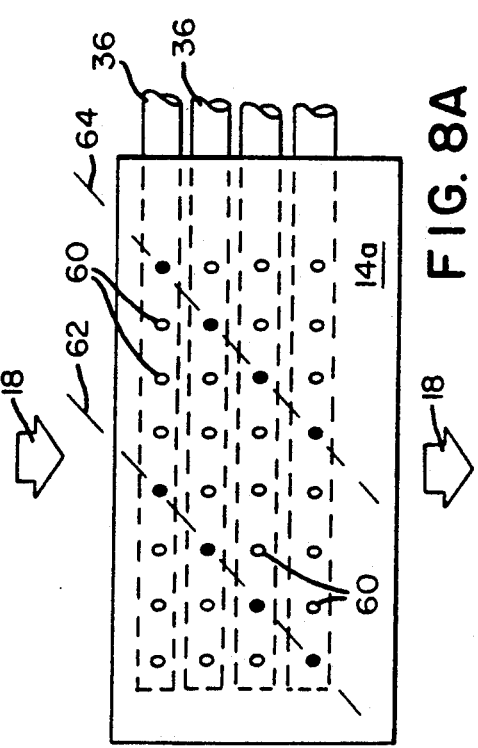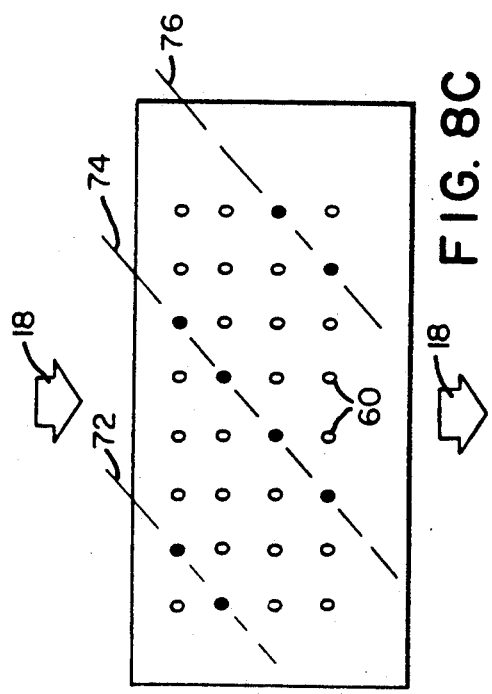

FUEL INJECTION SYSTEM FOR SCRAMJET ENGINES

The present invention relates generally to scramjet engines and particularly to a fuel injection system for improving scramjet performance during supersonic flight.

BACKGROUND OF THE INVENTION

A scramjet engine is an eminently simple air-breathing jet engine, since it contains no moving parts. That is, a scramjet engine consists basically of a converging inlet, a combustor and a diverging outlet or nozzle. During flight, air flows into the inlet and is compressed. In the combustor, hydrogen or hydrocarbon fuel is injected into the compressed, high temperature airstream and ignited. The resulting combustion expands and increases the pressure of the gases in the combustor, which are then accelerated out of the nozzle to a higher velocity than the inlet air. The reaction to the rearward velocity of the gases produces forward thrust capable of achieving supersonic and even hypersonic flight speeds.

One of the most critical problems encountered at supersonic speeds above Mach 4 is effective mixing of fuel and air in the combustor. If fuel and air do not mix together in overall intimate contact, combustion proceeds at a slower pace. Consequently, full thrust potential is not achieved. To enhance mixing efficiency, turbulence-producing struts have been positioned in the combustor to project into the airstream. However, the losses associated with any such obstructions in the airstream become intolerable at high Mach numbers.

Traditionally, fuel is injected as essentially continuous streams or sprays from a plurality of injectors variously positioned in the combustor of a scramjet engine. That is, fuel flow rate remains invariant over time for a given flight velocity. The inventors herein have determined that, because of the extremely high velocity and pressure of the airstream entering the combustor at high Mach numbers, continuous or steady state injection of fuel achieves only minimal penetration into the airstream and rather poor mixing of fuel and air. Consequently, top speed becomes unduly limited.

SUMMARY OF THE INVENTION

It is accordingly an objective of the present invention to improve the mixing efficiency of fuel and air in a scramjet engine by achieving more intimate contact between fuel and air. The resulting enhanced combustion characteristics enable the achievement of higher speeds well into the hypersonic range. To these ends, the present invention provides an improved fuel injection system comprising at least one fuel injector operating in a pulsed mode, rather than in a continuous or steady state mode, as heretofore has been conventional practice. The injector emits a succession of pulses or slugs of fuel at elevated flow rates and pressure into the airstream flowing through a scramjet engine combustor. Greater penetration into the airstream and dramatically enhanced contact, i.e., mixing, between fuel and air is thus achieved. Combustion occurs more rapidly and efficiently, rendering higher hypersonic speeds readily obtainable.

Preferably, plural fuel injectors operating in a pulsed mode are utilized. In accordance with various embodiments of the inventions, the injectors are relatively positioned and sequenced in pulsed operation, such that the fuel pulses injected by the multiple injectors can interact to further enhance fuel-air mixing. The duty cycles and the fuel flow rates of the pulse-operated multiple injectors are preferably coordinated to achieve overall stoichiometric burning of the fuel. Moreover, by virtue of the fuel injector pulsed operating mode, the overall operation of the combustor remains in a transient state, i.e., never achieves a steady state condition. Transient combustor operation not only further enhances fuel-air mixing, but disperses the heat load on the combustor. Combustor cooling is thus simplified.

The invention accordingly comprises the features of construction, combinations of elements, and arrangements of parts, all as detailed hereinafter, and the scope of the invention is indicated in the claims.

BRIEF DESCRIPTION OF THE DRAWINGS

For a full understanding of the nature and objectives of the present invention, reference may be had to the following Detailed Description taken in connection with the accompanying drawings, in which:

FIGS. 8A, 8B, 8C, 8D are a series of schematic diagrams illustrating a fuel injection system of the present invention comprising a matrix array of fuel injectors operated in a sequential, pulsed mode.

Like reference numerals refer to corresponding parts throughout the several figures of the drawings.

DETAILED DESCRIPTION

Figure 1:
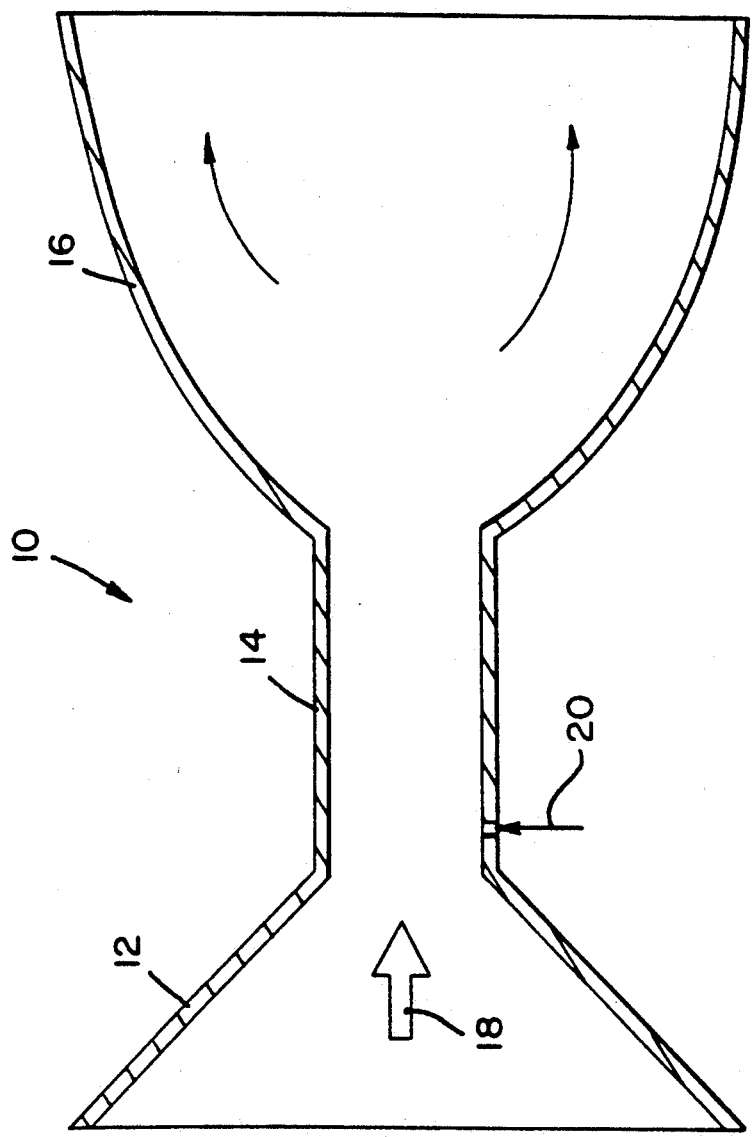
FIG. 1 is a simplified schematic diagram of a scramjet engine.

As schematically illustrated in FIG. 1, a scramjet engine 10 basically comprises a converging inlet 12, a combustor 14 and a diverging outlet or nozzle 16. In flight, intake air, represented by arrow 18, is compressed by the inlet, and mixed with fuel injected into the combustor by one or more injectors 20. The fuel-air mixture is ignited either spontaneously or by ignitors (not shown), and the combustion gases discharge through the nozzle at a higher velocity than the intake air to produce thrust.

Figure 2:
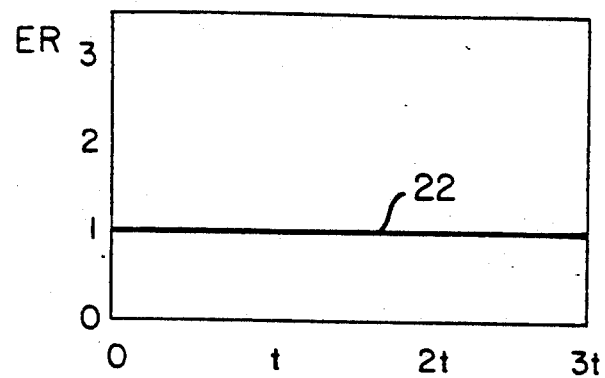
FIG. 2 is a combined graph and schematic diagram illustrating the steady state fuel injection approach for scramjet engines utilized in the prior art.
Figure 2:
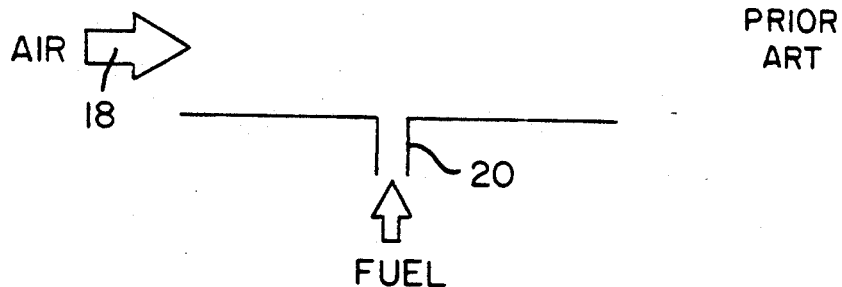

Assuming for the sake of simplicity a single fuel injector 20, FIG. 2 represents the traditional steady state mode of injector operation, wherein fuel is injected as a continuous stream into the compressed, high temperature airstream flowing through the compressor. It is assumed that fuel is being injected at a requisite flow rate to achieve an equivalence ratio (ER) of 1, wherein equivalence ratio is the ratio of fuel flow rate into the combustor to air flow rate through the combustor. As long as the injector geometry remains fixed, fuel flow rate and equivalence ratio are interchangeable factors. An ER of 1 theoretically produces stoichiometric combustion. Line 22 in FIG. 2 represents steady state operation of fuel injector 20 at an ER of 1 over a representative time interval 0–3$t$. The present inventors have discovered that such steady state operation produces poor penetration of fuel into the combustor, as well as poor mixing of fuel and air in the combustor. As a result, combustion proceeds at a less than ideal pace, to the prejudice of scramjet engine performance.

Figure 3:
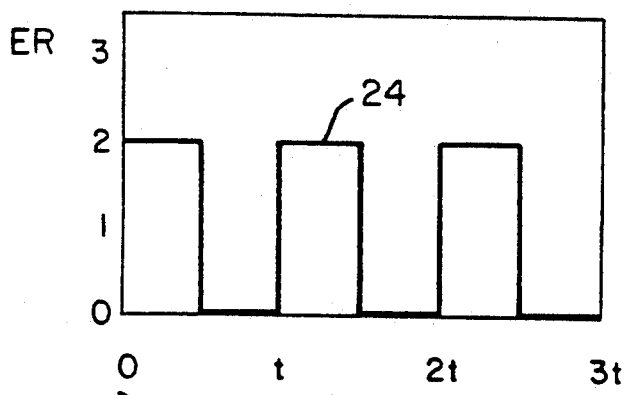
FIG. 3 is a combined graph and schematic diagram illustrating the pulsed fuel injection approach of the present invention as applied to scramjet engines.
Figure 3:
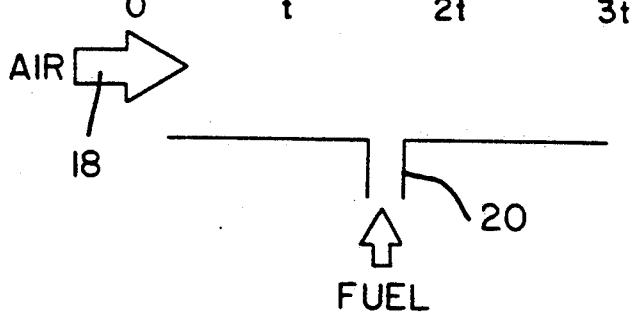

To maximize fuel penetration and fuel-air mixing in accordance with the present invention, fuel injector 20 is operated in a pulsed mode as illustrated in FIG. 3 by square wave 24. As seen, a pulse or slug of fuel is injected only during one-half of each of the periods 0–$t$, $t$–2$t$ and 2$t$–3$t$. If the amplitude of the fuel injection pulse is twice the steady state level of FIG. 2, i.e., ER of 2 versus ER of 1, the same overall fuel flow schedule is achieved in FIG. 3. The doubling of the ER in the pulsed mode requires effectively doubling the fuel pressure, and thus increased fuel penetration is obviously achieved. It will be appreciated that, rather than the 50% duty cycle of FIG. 3, a pulsed operating mode employing a 33⅓% duty cycle or a 25% duty cycle may be utilized pursuant to the present invention. In the case of a 33⅓% duty cycle, the ER of each fuel injection pulse would ideally be 3. A 25% duty cycle would then call for fuel injection pulses having an ER of 4. It will also be appreciated that, in reality, the fuel injection pulses will have a generally sinusodial shape, rather than the square wave pulses illustrated in FIG. 3.

Figure 4:
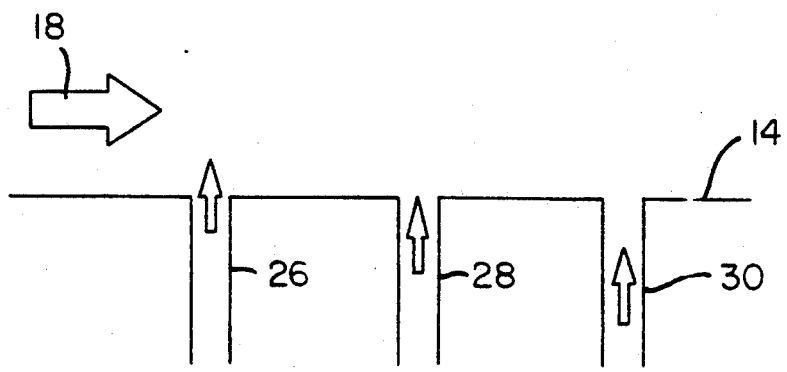
FIG. 4 is a schematic diagram of a fuel injection system including a plurality of fuel injectors operating in the pulsed mode of the present invention.

In practice, the pulsed mode fuel injection system of the present invention will include multiple fuel injectors selectively positioned in the combustor. FIG. 4 schematically illustrates one such approach, wherein three injectors 26, 28 and 30 are positioned in spaced, serial relation generally aligned with airstream 18 flowing through combustor 14. These injectors are controlled to inject slugs of fuel in repeating sequence from upstream injector 26 to injector 28 to injector 30. The characteristics of each fuel pulse and the sequencing rate are established to achieve optimum penetration and mixing consistent with a desired overall fuel flow schedule. Preferably, a slug of fuel injected by each upstream injector and entrained in the airstream arrives at the next downstream injector when the next fuel slug is injected, thereby to promote an optimum combustion rate.

Figure 5:
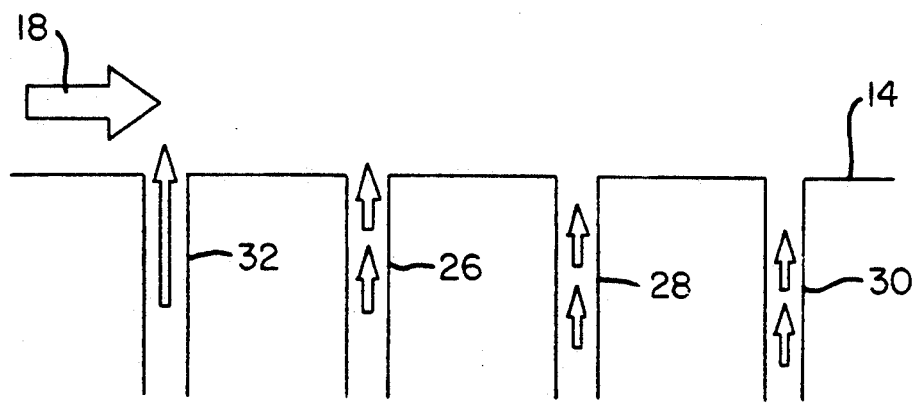
FIG. 5 is a schematic diagram of an alternative embodiment of the present invention wherein one fuel injector operating in a steady state mode is combined with multiple fuel injectors operating in a pulsed mode.

The objectives of the present invention can also be achieved by the approach illustrated in FIG. 5, wherein injectors 26, 28 and 30 operating in the pulse-sequenced mode of FIG. 4 are positioned downstream from an injector 32 operating in the steady state mode of FIG. 2, i.e., injecting a steady continuous stream of fuel. Operation of upstream injector 32 in the steady state mode will create a momentum defect in the airstream which will enhance the mixing efficiency achieved by the downstream injectors operating in a sequential pulsed mode.

Figure 6:
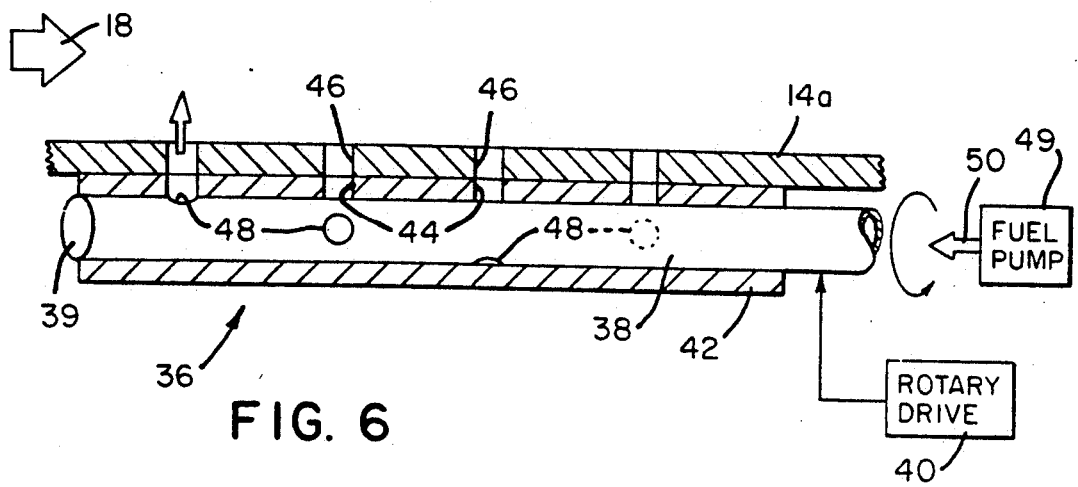
FIG. 6 is an axial cross sectional view, partially broken away, of a fuel distributor valve constructed in accordance with the present invention to operate multiple injectors in a sequential, pulsed mode.

While the system of the present invention may be implemented using fast-acting solenoid valves to operate the fuel injectors in pulsed mode, a rotary fuel distributor valve, as generally indicated at 36 in FIG. 6 is preferred in view of the high pulsing frequencies involved. Thus, valve 36 comprises a fuel tube 38 having a closed end 39, which is rotated about its axis at high speed by a suitable rotary drive 40. This fuel tube is surrounded by a stationary close-fitting sleeve 42 having orifices 44 positioned in registry with injector orifices 46 in combustor wall 14$a$. Fuel tube 38 is formed with a plurality of orifices 48 which are axially spaced apart in conformity with the spacings between the registered sets of sleeve and combustor wall orifices. The fuel tube orifices are also located in predetermined, angularly spaced or phased relation.

From this description it is seen that, with fuel, indicated by arrow 50, fed under pressure into the open end of fuel tube 38 by suitable means, such as a fuel pump 49, and with the fuel tube rotated by drive 40, pulses of fuel are injected into the combustor each time during every fuel tube revolution that orifices 48 revolve into open communication with the registered sleeve and combustor wall orifices. to accommodate higher pulse frequencies, multiple, uniformly angularly spaced orifices 48 may be provided at each axial position of radial alignment with the registered orifice 44, 46 set, as an alternative to driving the fuel tube at correspondingly higher angular velocities. By injecting a large number of relatively small fuel slugs at high repetition rate, the interfacial surface area between fuel and air can be dramatically increased. This more intimate mutual contact enhances fuel-air mixing, leading to a higher combustion rate and enhanced scramjet engine hypersonic performance well beyond the limits encountered when using a steady state fuel injection approach.

Figure 7:
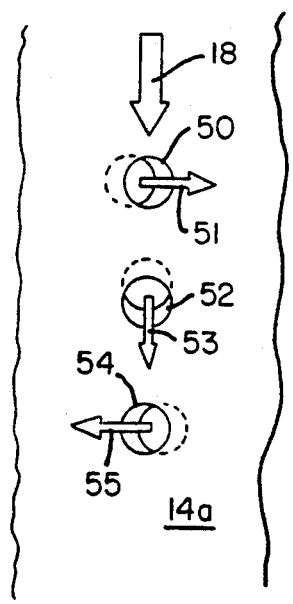
FIG. 7 is a plan view illustrating a series of canted fuel injection orifices applicable to the present invention.

Additional benefits, particularly in fuel-air mixing can be achieved by injecting fuel at oblique angles relative to the direction of airstream flow, rather than normal thereto. Thus, FIG. 7 illustrates a series of orifices 50, 52 and 54 drilled through combustor wall 14$a$ at oblique angles, i.e., canted. As illustrated, orifice 50 is canted such that fuel is injected laterally to the right (arrow 51) relative to airstream 18. Orifice 52 is canted to inject fuel in the downstream direction (arrow 53), while orifice 54 is canted to inject fuel laterally to the left (arrow 55). It is seen that orifices 50 and 54 spread fuel laterally to improve fuel-air mixing in lateral directions. It will be appreciated that the canting directions illustrated in FIG. 7 need not be normal to or aligned with airstream 18. Moreover, the port locations need not be in a serial array aligned with the airstream.

FIGS. 8A–8D illustrate this point with a four by eight matrix of fuel injection orifices 60. Each column or, alternatively, each row of orifices may be supplied by a separate fuel distributor valve 36 of FIG. 6. FIG. 8A illustrates a separate distributor valve 36 feeding each row of orifices. The darkened orifices indicate which set of eight different orifices are simultaneously injecting fuel during each of four intervals in the firing sequence depicted in FIGS. 8A–8D. Thus, in FIG. 8A, the four orifices 60 aligned with diagonal 62 and the four orifices aligned with diagonal 64 are all injecting fuel during the first interval of the sequence. FIG. 8B illustrates the next interval, wherein the single orifice along diagonal 66, the four orifices along 68, and the three orifices along diagonal 70 are all injecting fuel. Then in the next interval (FIG. 8C) the two orifices along diagonal 72, the four orifices along diagonal 74 and the two orifices along diagonal 76 are all injecting fuel. To complete a pulsing sequence, fuel is injected through the three orifices along diagonal 78, the four orifices along diagonal 80 and the one orifice along diagonal 82, as illustrated in FIG. 8D. The pulsing sequence then repeats from FIG. 8A to FIG. 8D.

It is seen that, during each injection interval of every pulsing sequence, fuel is injected through a different orifice 60 of each column and a different pair of orifices spaced four orifice positions apart in each row. As a result, a large number of small fuel pulses are injected into the airstream to be intimately surround by air. Enhanced fuel-air mixing is thus achieved in both the longitudinal and lateral directions. Moreover, since only a fraction (eight out of thirty two) of the injectors are injecting fuel at a time, the pulses can be of a lower equivalence ratio, i.e., flow rate. Consequently, unduly high fuel line pressures are not required.

It is important to also note that the pulsing action of the injected fuel results in transient operation of the combustor as a whole. The combustor will simply never reach a steady state condition because the locations of the injected fuel pulses are constantly changing. Thus shock waves, vortices, etc., will be constantly moving through the combustor to provide a beneficial synergistic effect on fuel-air mixing. As a collateral benefit, the heat load on the combustor is much less localized, thus simplifying the provisions necessary to cool the combustor.

From the foregoing description, it is seen that the objectives of the present invention are efficiently attained, and, since certain changes may be made in the constructions set forth in the Detailed Description without departing from the scope of the invention, it is intended that matters of detail be taken as illustrative and not in a limiting sense.

Having described the invention, what is claimed as new and desired to secure by Letters Patent is:

1. A fuel injection system for a scramjet engine including a combustor having a supersonic airstream flowing longitudinally therethrough, said system comprising, in combination:
   A. at least one fuel injector for injecting fuel into the combustor, and
   B. means for operating said fuel injector in a pulsed mode such as to periodically inject fuel as a succession of time-spaced pulses of fuel to enhance mixing of fuel and air;
   C. said means for operating comprising a rotary fuel distributor valve;
   D. wherein said operating means causes the fuel pulses to be injected at an elevated pressure relative to a fuel pressure of a continuously-flowing fuel injector flowing fuel at a rate to provide stoichiometric combustion in the combustor, said elevated pressure enhancing fuel penetration into the combustor.

2. The fuel injection system defined in claim 1, wherein said means for operating further comprises a drive means for rotating said rotary fuel distributor valve at an angular speed which causes the frequency, duration, and equivalence ratio of the fuel pulses to achieve an overall fuel flow schedule of said at least one fuel injector which is comparable to that achieved by a continuously-flowing fuel injector flowing fuel at a rate to provide stoichiometric combustion in the combustor.

3. A fuel injection system for a scramjet engine including a combustor having a supersonic airstream flowing longitudinally therethrough, said system comprising, in combination:
   A. a plurality of fuel injectors for injecting fuel into the combustor, and
   B. means for operating each of said plurality of fuel injectors in a pulsed mode such as to periodically inject fuel as a succession of time-spaced pulses of fuel to enhance mixing of fuel and air;
   C. said means for operating comprising a rotary fuel distributor valve;
   D. wherein said plurality of fuel injectors are positioned in axially spaced relation, said rotary fuel distributor valve including a fuel tube having a closed end and an open end into which fuel is fed under pressure, and at least one fuel orifice at each of a plurality of axially spaced locations aligned with corresponding ones of said plural fuel injectors, said fuel orifices being in angularly spaced relation, wherein said rotary fuel distributor valve operates said plurality of fuel injectors in repeating sequence to inject fuel pulses in time-phased relation.

4. A fuel injection system for a scramjet engine including a combustor having a supersonic airstream flowing longitudinally therethrough, said system comprising, in combination:
   A. a plurality of fuel injectors for injecting fuel into the combustor, and
   B. means for operating each of said plurality of fuel injectors in a pulsed mode for periodically injecting fuel through each of said injectors into the combustor as a succession of time-spaced pulses of fuel to enhance penetration of the fuel into the airstream and to enhance mixing of the fuel and air;
   C. wherein said plurality of fuel injectors are positioned in axially spaced, serial relation substantially longitudinally aligned with the airstream flow through the combustor.

5. A fuel injection system for a scramjet system including a combustor having a supersonic airstream flowing longitudinally therethrough, said system comprising, in combination:
   A. a plurality of fuel injectors for injecting fuel into the combustor, and
   B. means for operating each of said plurality of fuel injectors in a pulsed mode such as to inject fuel as a succession of time-spaced pulses of fuel to enhance mixing of fuel and air;
   C. wherein said plurality of fuel injectors are positioned in spaced relation, said means operates said plurality of fuel injectors in repeating sequence to inject fuel pulses in time-phased relation, said system further including at least one additional fuel injector positioned upstream from said plurality of fuel injectors, said at least one additional fuel injector injecting a steady continuous stream of fuel into the airstream thereby enhancing a mixing efficiency of said plurality of fuel injectors.

6. A fuel injection system for a scramjet engine including a combustor having a supersonic airstream flowing longitudinally therethrough, said system comprising, in combination:
   A. a plurality of fuel injectors for injecting fuel into the combustor, and
   B. means for operating each of said plurality of fuel injectors in a pulsed mode such as to inject fuel as a succession of time-spaced pulses of fuel to enhance mixing of fuel and air:
   C. wherein said plurality of fuel injectors are positioned in serial spaced relation, and said operating means includes a distributor valve having
      1) a fuel tube having a closed end, and an open end into which fuel is fed under pressure, and at least one first fuel orifice at each of a plurality of axially spaced locations in relatively angularly spaced relation, and 2) a sleeve surrounding said tube in close-fitting relation and having a separate second fuel orifice radially aligned with each said first fuel orifice axial location, each said second fuel orifice being in stationary registration with a third fuel orifice of a different one of said plurality of fuel injectors, whereby fuel pulses are injected by said fuel injectors in repeating sequence as said first fuel orifices revolve into open communication with the pairs of registered second and third fuel orifices during each revolution of said fuel tube.

7. A fuel injection system for a scramjet engine including a combustor having a supersonic airstream flowing longitudinally therethrough, said system comprising, in combination:
   A. a plurality of fuel injectors for injecting fuel into the combustor, and
   B. means for operating each of said plurality of fuel injectors in a pulsed mode such as to periodically inject fuel as a succession of time-spaced pulses of fuel to enhance mixing of fuel and air,
   C. said means for operating comprising a rotary fuel distributor valve;
   D. wherein said plurality of fuel injectors are positioned in a matrix array, and said rotary fuel distributor valve operates said plurality of injectors in repeating sequence to inject fuel pulses in time-phased relation.

8. A fuel injection system for an air-breathing jet engine having a combustor through which a compressed airstream flows, said system comprising, in combination:
   A. a plurality of fuel injectors positioned to inject fuel into the combustor at a corresponding plurality of predetermined locations; and
   B. valve means for intermittently feeding fuel to each of said fuel injectors and for feeding fuel to said plurality of fuel injectors in a predetermined repeating sequence, whereby to maintain the combustor in a transient state and to enhance fuel penetration into the compressed airstream and mixing of fuel and air, wherein said valve means comprises a rotary fuel distributor valve.

9. The fuel injector system of claim 8, wherein said rotary fuel distributor valve feeds fuel to each of said fuel injectors as a succession of time-spaced pulses of fuel at an elevated pressure relative to that required to operate a continuously-flowing fuel injector flowing fuel at a rate to provide stoichiometric combustion in the combustor, said elevated pressure enhancing fuel penetration into the compressed airstream and enhancing mixing of fuel and air.

10. The fuel injection system defined in claim 9, further comprising a drive means for rotating said rotary fuel distributor valve at an angular speed which causes the frequency, duration and equivalence ratio of the fuel pulses of said plurality of fuel injectors to achieve an overall fuel schedule of said plurality of fuel injectors which is comparable to that achieved by an equal number of continuously-flowing fuel injectors flowing fuel at a combined rate to provide stoichiometric combustion in the combustor.

11. The fuel injector system defined in claim 8, wherein said plurality of fuel injectors are positioned in axially spaced, serial relation substantially longitudinally aligned with the airstream flow through the combustor.

12. The fuel injector system defined in claim 8, wherein said fuel injectors are positioned in spaced, serial relation transversely to the airstream flow through the combustor.

13. A fuel injection system for an air-breathing jet engine having a combustor through which a compressed airstream flows, said system comprising, in combination:
   A. a plurality of fuel injectors positioned to inject fuel into the combustor at a corresponding plurality of predetermined locations; and
   B. valve means for intermittently feeding fuel to said fuel injectors in a predetermined repeating sequence, whereby to maintain the combustor in a transient state and enhance mixing of fuel and air;
   C. wherein a first group of said fuel injectors are positioned in spaced, serial relation generally longitudinally aligned with the airstream flow through the combustor and a second group of said fuel injectors are positioned in spaced, serial relation transversely of the airstream flow.

14. The fuel injection system defined in claim 13, wherein said first and second groups of said fuel injectors are arranged in a matrix array of rows and columns of said fuel injectors, and said valve means feeds successions of fuel pulses concurrently to preselected different groups of said fuel injectors in repeating sequence.

15. A fuel injection system for an air-breathing jet engine having a combustor through which a compressed airstream flows, said system comprising, in combination;
   A. a plurality of fuel injectors positioned to inject fuel into the combustor at a corresponding plurality of predetermined locations; and
   B. valve means for intermittently feeding fuel to said fuel injectors in a predetermined repeating sequence, whereby to maintain the combustor in a transient state and enhance mixing of fuel and air;
   C. wherein said plurality of fuel injectors are positioned in serial spaced relation, and said valve means comprises a distributor valve having
      1) a fuel tube having a closed end, and an open end into which fuel is fed under pressure, and at least one first fuel orifice at each of a plurality of axially spaced locations in relatively angularly spaced relation, and
      2) a sleeve surrounding said tube in close-fitting relation and having a separate second fuel orifice radially aligned with each said first fuel orifice axial location, each said second fuel orifice being in stationary registration with a third fuel orifice of a different one of said plural fuel injectors, whereby fuel pulses are emitted by said fuel injectors in repeating sequence as said first fuel orifice revolves into open communication with each pair of registered second and third fuel orifices during each revolution of said fuel tube.

* * * * *